US006634453B2

(12) United States Patent
Arthur et al.

(10) Patent No.: US 6,634,453 B2
(45) Date of Patent: Oct. 21, 2003

(54) ERGONOMIC TRACTOR SEAT ARMREST AND HAND CONTROL

(75) Inventors: John R. Arthur, Grovetown, GA (US); Russell W. Strong, Craftsbury Common, VT (US)

(73) Assignee: Deere & Company, Moline, IL (US)

( * ) Notice: Subject to any disclaimer, the term of this patent is extended or adjusted under 35 U.S.C. 154(b) by 30 days.

(21) Appl. No.: 09/945,549

(22) Filed: Aug. 29, 2001

(65) Prior Publication Data

US 2003/0042063 A1 Mar. 6, 2003

(51) Int. Cl.$^7$ .............................. B60K 26/00; B60N 2/46
(52) U.S. Cl. ...................................... 180/315; 297/411.2
(58) Field of Search ................................. 180/315, 333, 180/334, 335, 336; 297/411.2, 411.4, 217.3; 248/118; 74/471 XY; D15/28; D6/501

(56) References Cited

U.S. PATENT DOCUMENTS

| 4,200,166 A | * | 4/1980 | Hansen ........................ 180/315 |
| 4,476,954 A | * | 10/1984 | Johnson et al. .............. 180/333 |
| 4,702,520 A | | 10/1987 | Whisler et al. |
| 4,895,040 A | * | 1/1990 | Soederberg .................. 74/491 |
| 5,924,515 A | | 7/1999 | Stauffer |
| 5,938,282 A | | 8/1999 | Epple |
| 6,039,141 A | | 3/2000 | Denny |
| 6,065,560 A | * | 5/2000 | Palmeri et al. .............. 180/326 |
| D427,207 S | | 6/2000 | Altmann et al. |
| D427,208 S | | 6/2000 | Altmann et al. |
| 6,131,062 A | * | 10/2000 | Nielsen ........................ 701/50 |

FOREIGN PATENT DOCUMENTS

| DE | 3806778 A1 | | 9/1988 |
| DE | 199 51 379 A1 | | 5/2001 |
| FR | 2 770 468 | | 5/1999 |
| JP | 2000-148273 | * | 5/2000 |

OTHER PUBLICATIONS

Pending U.S. patent application 09/825,726, filed Apr. 4, 2001.
Pending U.S. patent application 29/139,638, filed Apr. 4, 2001.

* cited by examiner

Primary Examiner—Paul N. Dickson
Assistant Examiner—David R. Dunn
(74) Attorney, Agent, or Firm—Polit & Erickson, LLC

(57) ABSTRACT

An armrest having an elbow-supporting portion and an associated control panel for a utility vehicle is arranged such that the operator's forearm can be supported on a fulcrum position on the elbow-supporting portion and can be pivoted in a swinging direction to reach plural controls. A hand rest is also provided on the control panel and located such that an operator can span his forearm from the elbow at the fulcrum position of the elbow-supporting portion, to the hand rest located on the control panel.

14 Claims, 4 Drawing Sheets

ERGONOMIC TRACTOR SEAT ARMREST AND HAND CONTROL

TECHNICAL FIELD OF THE INVENTION

The present invention relates to utility vehicle operator's station, and particularly to a utility vehicle seat armrest and adjacent control panel.

BACKGROUND OF THE INVENTION

Utility vehicles such as compact tractors can include multiple control levers and switches mounted on a control panel adjacent to the operator's seat. These controls are positioned adjacent to the operator's seat to allow the operator to rest his arm on an adjacent armrest until a change in the controls is required. Typically, if a change in controls is required, the operator must shift his arm and pivot his forearm about the associated elbow in a swinging motion towards the controls, which movement requires the arm and shoulder to be unsupported.

The present inventors have recognized the desirability of providing an armrest and control panel layout which reduces operator fatigue and which contribute to effective and efficient operation of the utility vehicle.

SUMMARY OF THE INVENTION

The present invention provides an ergonomic armrest having an associated elbow-supporting portion. A control panel is arranged sufficiently close to the arm and elbow-supporting portion that the operator can support his hand on a hand reference provided on the control panel. The controls of the control panel are arranged in a circular path, allowing the operator's elbow to remain supported on the armrest during control manipulation to reduce operator fatigue caused by moving his arm and hand to a different control, unsupported during the movement.

As viewed from above the seat and armrest, the layout of the improved armrest and control panel is such that the operator's right elbow, resting upon the elbow-supporting portion becomes a fulcrum for the forearm movement to access controls on the control panel. Control levers and switches are within fingertip reach as the operator's forearm can be swept over the control panel. The elbow-supporting portion on the right armrest is shaped such that it does not interfere with downward movement of the forearm, and accommodates variable physical aspects of different operators. An operator having a large torso will not have his elbow in the same lateral location as an operator with a slender torso. The shape of the elbow-supporting portion accommodates both size operators.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 2:
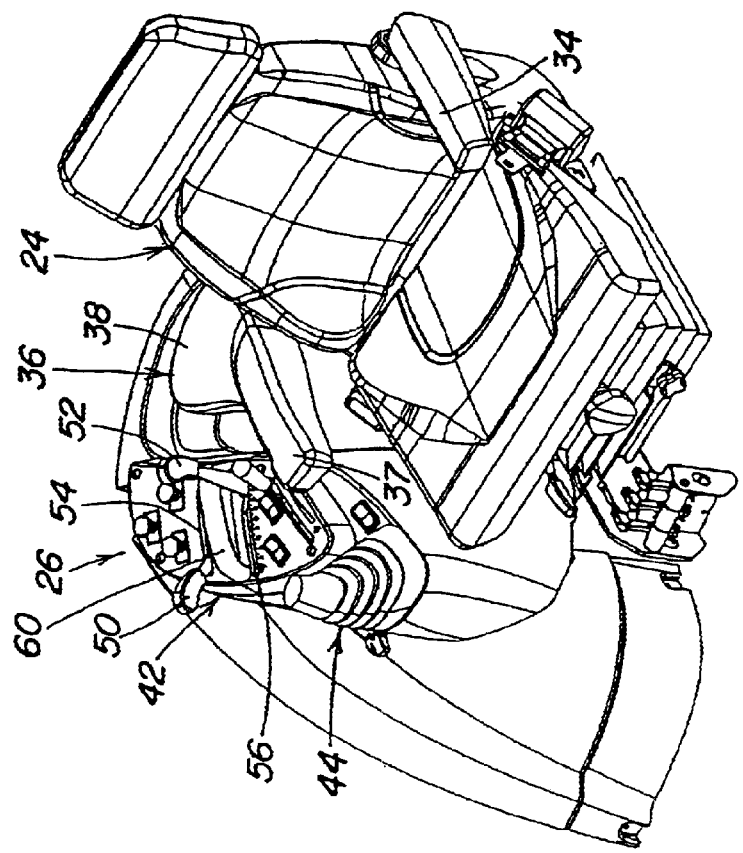
FIG. 2 is a fragmentary perspective view of the armrest and control panel of the compact tractor shown in FIG. 1.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
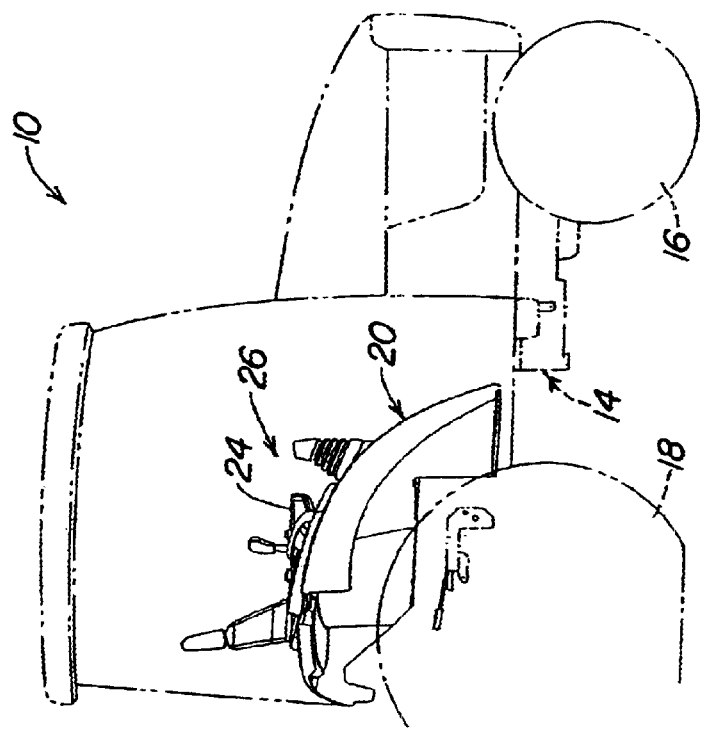
FIG. 1 is an elevational view of a compact tractor incorporating the armrest and control panel of the present invention.

FIG. 1 illustrates a utility vehicle 10 such as a compact tractor including a chassis or frame 14 supported on front wheels 16 and larger rear wheels 18. A floor and fender structure 20 is supported on the frame 14 and carries a seat 24 and controls 26.

FIG. 2 illustrates the operator seat 24 including a left armrest 34 and right armrest 36. Adjacent to the right armrest 36 is a control panel 42 which carries the controls 26. A selective control valve boot 44 is shown, the selective control valve lever extending from the boot is not shown for clarity of description of the controls 26. Among the controls 26 on the control panel 42 are rock shaft, or three point hitch, control lever 52 and remote control valve lever 50. These levers actuate in forward and reverse directions through slots 56, 54, respectively. Between the slots 54, 56, a control hand reference 60 is mounted to the panel 42.

The armrest 36 includes a support region 37 that is substantially flat and elongated horizontally in a substantially rearward to forward direction. The elbow-supporting region 38 fans rearward from the support region 37. The elbow-supporting region 38 includes a downward slope in a fanning-direction toward the control panel 42 which allows for a slight downward tilting of the forearm to control the controls without interfering with the arm. The elbow-supporting region 38 also extends rearward sufficiently to allow forearm support for an operator who is turning toward the back during operation of rear tools or accessories.

Figure 3:
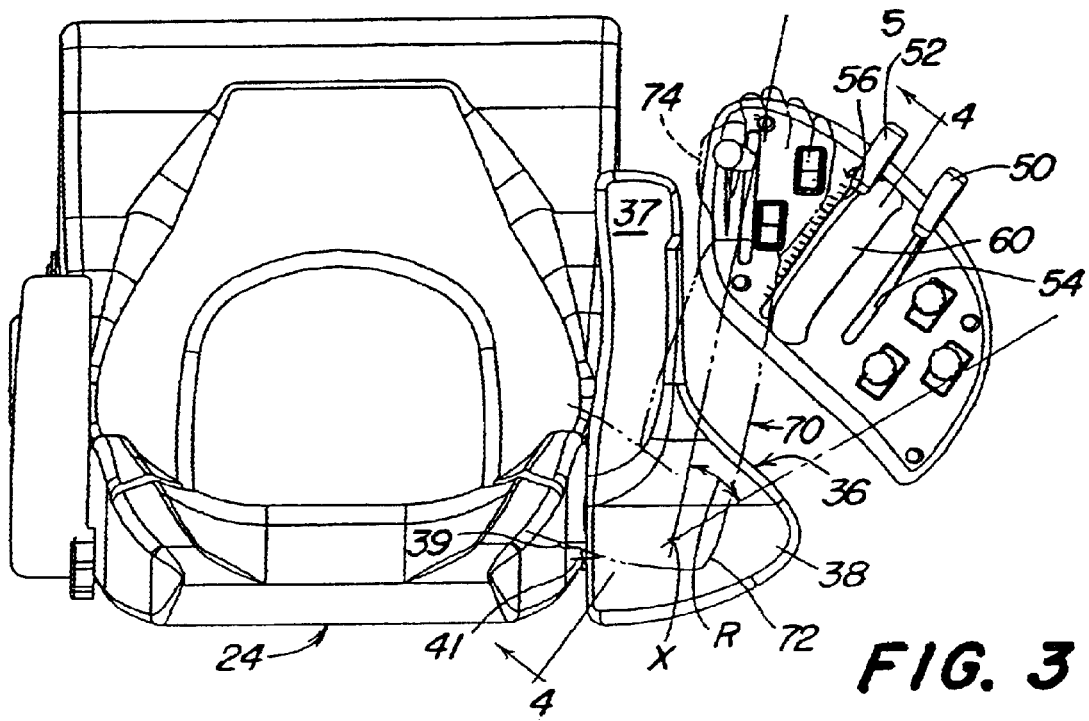
FIG. 3 is a schematic plan view of the armrest and control panel of the present invention showing an operator's range of arm movement.

As shown in FIG. 3, the controls 26, including the associated slots 54, 56, and the levers 50, 52 are arranged in a substantially circular segment path given a center point or fulcrum marked "X" on the elbow-supporting region 38. An operator's forearm 70 is shown in phantom, including an elbow 72 and a hand 74. The fulcrum is located to be associated with the operator's elbow 72, allowing the operator a swinging motion of his forearm about the fulcrum X through an angle R to comfortably engage all of the controls 26. The operator can rest his hand 74 on the control hand reference 60 during operation of the utility vehicle and can operate the levers 50, 52 with his hand partially engaged to the control hand reference 60.

The armrest is secured to the seat by a an L-shaped bracket 39 welded to the seat back and fastened with fasteners 41 into a side of the elbow-supporting portion 38. The elbow-supporting portion 38 is declined from the arm supporting surface 37. The armrest 36 can comprise a padded interior covered by a vinyl or leather skin.

Figure 4:
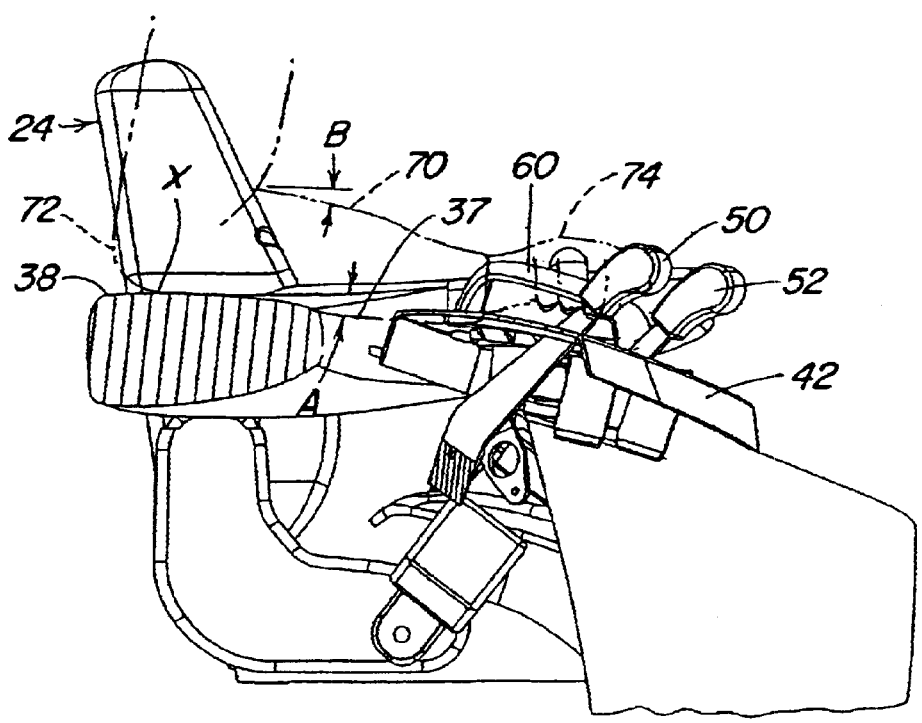
FIG. 4 is a sectional view taken generally along line 4—4 of FIG. 3.

FIG. 4 illustrates the operator's forearm 70 (in phantom) with the elbow 72 supported on the elbow-supporting portion 38 and the hand 74 resting on the hand reference 60. In order to allow for an unrestricted or downward movement to access the controls 26, the elbow-supporting portion 38 is sloped downwardly by the angle A (to the horizontal) which is greater than the downward tilt of the forearm, generally the angle B (to the horizontal).

Figure 5:
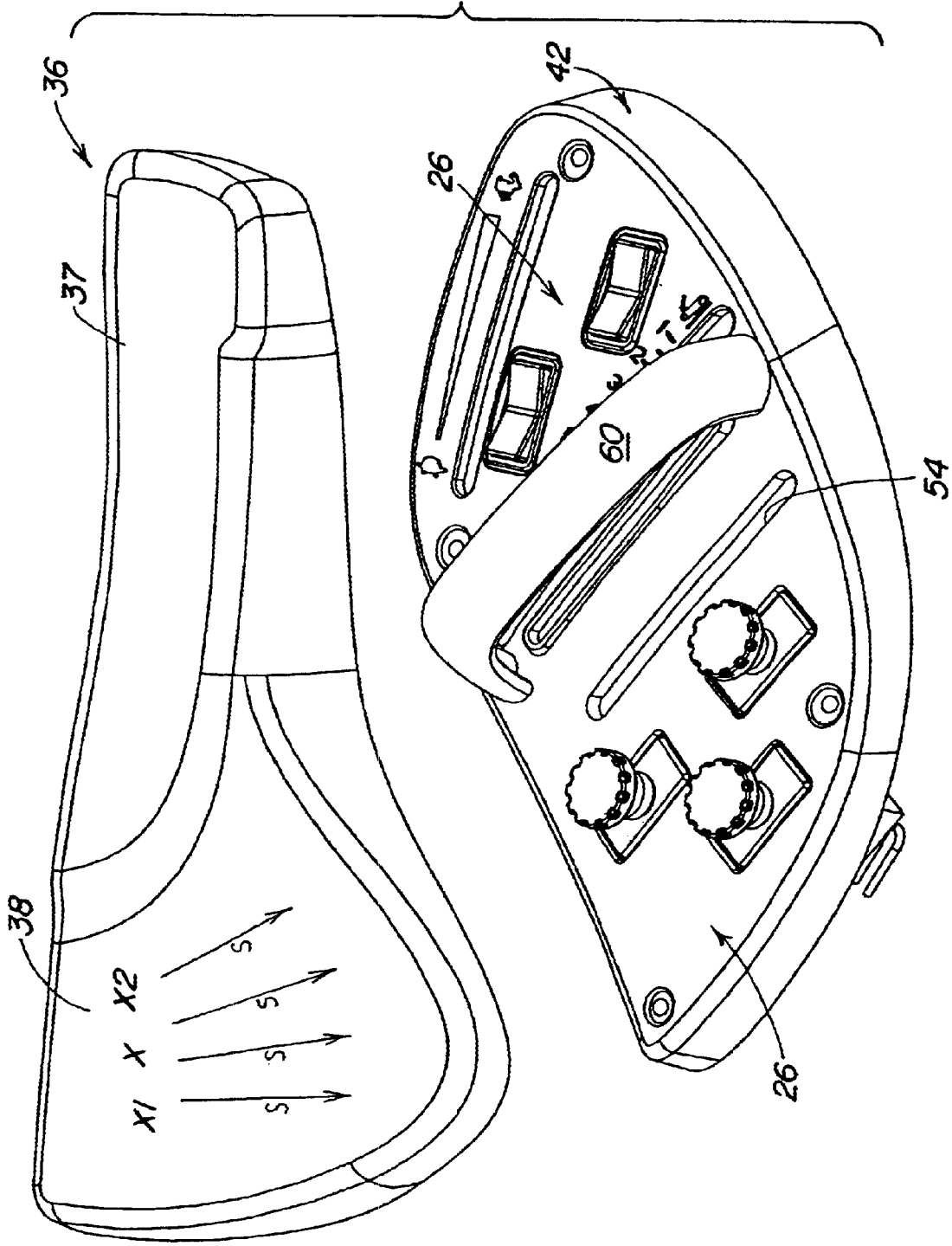
FIG. 5 is a fragmentary perspective view of the armrest and control panel of the present invention.
Figure 6:
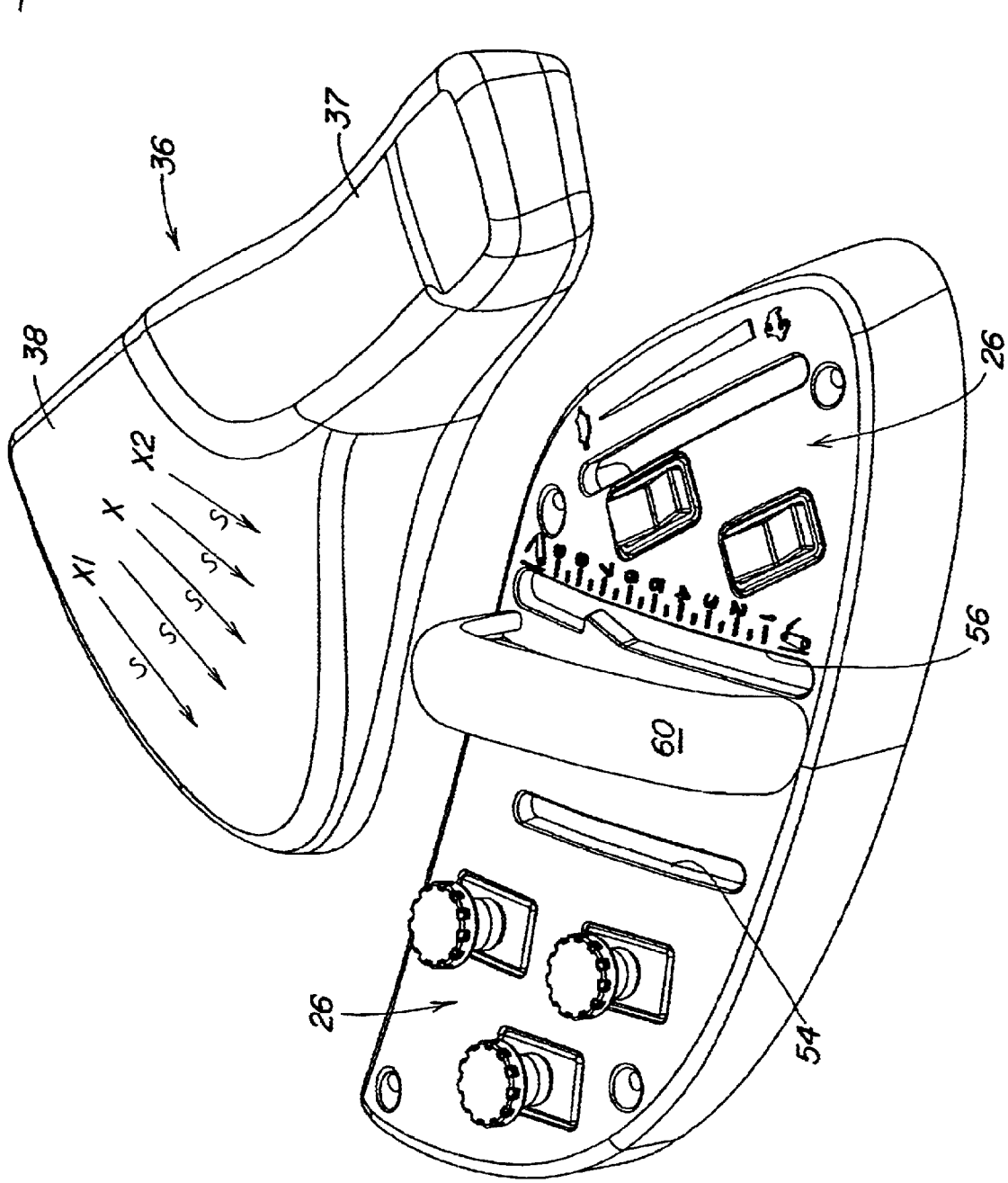
FIG. 6 is another fragmentary perspective view of the armrest and control panel of the present invention.

As illustrated in FIGS. 5 and 6 the elbow-supporting portion 38 is declined toward the controls 26. Lines of downward slope "s" are shown to illustrate the general contour of the elbow-supporting portion 38. The elbow-supporting portion 38 is sized to ergonomically receive the elbow of different size operators. For example, the points X1 and X2 can also be fulcrums for different-size operators which allow for comfortable swinging of the operator's arm to reach the controls 26.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. In a utility vehicle having an operator's seat and a control panel adjacent the operator's seat, the improvement comprising:

an armrest located adjacent the operator's seat, said armrest including an armrest portion having a forearm support surface extending substantially horizontally, and arranged to support the operator's forearm when the forearm is resting in a rear to front orientation, and an elbow-supporting portion extending laterally of said forearm support surface and having an elbow support surface sloping down and away from said armrest portion; and said control panel arranged in front of and laterally of said armrest portion and spaced from the elbow-supporting portion a sufficiently close distance such that an operator's forearm, between elbow and fingertips, is capable of spanning between the elbow-supporting portion and the control panel; and a plurality of controls are located on said control panel and are arranged to be actuatable by said operator without lifting his elbow from the elbow support surface.

2. The improvement according to claim 1, wherein said elbow-supporting portion is fan-shaped from an elbow-supporting fulcrum position toward the control panel, allowing a sweeping motion of said forearm from said fulcrum position.

3. The improvement according to claim 2, wherein said elbow-supporting portion is declined in a direction from said fulcrum position toward said control panel, said decline sufficient to prevent interference with the operator's forearm as said forearm is positioned to engage said controls with an operator's hand of the operator's forearm.

4. The improvement according to claim 1, wherein said control panel includes a hand rest, and said hand rest is located at a radial distance from said fulcrum position, being sufficiently close such that the operator's forearm is capable of spanning between said elbow support surface and said hand rest.

5. The improvement according to claim 1, wherein said armrest portion is elongated in a front-to-back direction.

6. The improvement according to claim 1, wherein said elbow-supporting portion is secured to said seat by a bracket.

7. The improvement according to claim 1, wherein said elbow support surface of said elbow supporting portion extends rearward behind the forearm support surface of the armrest portion.

8. In a utility vehicle having an operator's seat and a control panel adjacent the operator's seat, the improvement comprising:

an armrest located adjacent the operator's seat, said armrest including an elbow-supporting portion extending in a rearward to forward direction and in a lateral direction, said elbow-supporting portion having an elbow support surface; and said control panel arranged adjacent to the elbow-supporting portion a sufficiently close distance such that an operator's forearm, between elbow and fingertips, is capable of spanning between the elbow-supporting portion and the control panel, said elbow support surface of said elbow supporting position substantially sloped in a direction when projected into a horizontal plane that is oblique to the rearward-to-forward direction; and controls on said control panel are arranged to be actuatable by said operator without lifting his elbow from the elbow-supporting portion.

9. The improvement according to claim 8, wherein said elbow-supporting portion is fan-shaped from an elbow-supporting fulcrum position toward the control panel, allowing a sweep angle of the forearm about said fulcrum position, the controls on the control panel located in a pattern having a width, the width substantially corresponding to the arc of the sweep angle.

10. The improvement according to claim 8, wherein said elbow support surface is declined in a direction toward said control panel, said decline sufficient to prevent interference with the operator's forearm as said forearm is positioned to engage said controls with an operator's hand of the operator's forearm.

11. The improvement according to claim 8, wherein said control panel includes a hand rest, and said hand rest is located at a select distance from said elbow support surface, said select distance being sufficiently close such that the operator's forearm, between elbow and hand, is capable of spanning between said elbow support surface and said hand rest.

12. The improvement according to claim 8, further comprising an armrest portion adjacent to said elbow-supporting portion, said armrest portion being elongated in a front-to-back direction and having a substantially flat forearm support surface.

13. The improvement according to claim 12, wherein said elbow support surface extends rearwardly behind said forearm support surface.

14. The improvement according to claim 8, wherein said elbow-supporting portion is secured to said seat by a bracket.

* * * * *